United States Patent [19]
Ziemer

[11] Patent Number: 5,969,745
[45] Date of Patent: Oct. 19, 1999

[54] GRAY SHADE DRIVER FOR PIXEL ARRAY

[75] Inventor: Craig Brian Ziemer, New Holland, Pa.

[73] Assignee: Lucent Technologies Inc, Murray Hill, N.J.

[21] Appl. No.: 08/900,363

[22] Filed: Jul. 12, 1997

[51] Int. Cl.⁶ ................................................. B41J 2/435
[52] U.S. Cl. ........................... 347/237; 347/240; 358/298
[58] Field of Search .................................. 345/89, 98, 99; 358/455, 454, 298; 395/48, 49; 348/22, 700, 7; 257/798, 1, 900, 930; 347/237, 240

[56] References Cited

U.S. PATENT DOCUMENTS

| | | | |
|---|---|---|---|
| 4,750,010 | 6/1988 | Ayers et al. | 358/298 X |
| 5,266,936 | 11/1993 | Saitoh | 345/98 |
| 5,541,629 | 7/1996 | Saunders et al. | 347/12 |

*Primary Examiner*—N. Le
*Assistant Examiner*—Shih-Wen Hsieh

[57] ABSTRACT

A pixel array driver for applying gray level voltages to a group of pixels without the use of a ramp voltage generator employs an integrated circuit arrangement which multiplexes a plurality of discrete gray level voltages in staircase fashion onto a high-voltage bus, identifies each of the discrete voltages appearing on the high-voltage bus with a code word applied to a code word bus, and matches for each pixel the word on the code word bus to a previously stored data word that designates the gray level intensity voltage desired at the pixel. When the code word and the data word match, the pixel is disconnected from the high-voltage bus. Each pixel is provided with a sample and hold circuit to maintain the value of voltage reached after being disconnected from the high-voltage bus.

15 Claims, 3 Drawing Sheets

5,969,745

GRAY SHADE DRIVER FOR PIXEL ARRAY

FIELD OF THE INVENTION

This invention relates to electronic printing and, more particularly to delivering high-voltage, gray-level driving voltages to electrostatically operated print heads, printing presses or electro-luminescent flat-panel displays.

BACKGROUND OF THE INVENTION

Heretofore, electrostatically operated print heads and electro-luminescent displays have required the use of external control circuitry to supply a high-voltage ramp waveform and to employ a large holding capacitor and 7-bit data words to select the particular value reached by the ramp waveform to drive a particular pixel to the desired level of shading intensity. The range of gray-level shading intensity typically requires 16 levels of voltage between 0 volts and 300 volts to be provided by the external ramp voltage generator. The 7-bit data word was needed to achieve the desired accuracy in designating the gray level voltage. To reduce the cost of such displays and provide for high resolution, it would be desirable to integrate the driving and control circuitry together with the circuitry of the print head or display unit itself, provided this can be done without degrading the resolution or granularity of the display. However, the circuitry required to generate the ramp function voltage and process the 7-bit data word, as well as the large capacitor required to store the ramp function voltage, requires an inordinate amount of silicon and heretofore it has not been possible to achieve the desired degree of component concentration.

SUMMARY OF THE INVENTION

In accordance with the principles of the present invention, in one illustrative embodiment thereof, instead of generating a ramp voltage and requiring a large amount of silicon to process the data and store the ramp voltage, a highly concentrated integrated circuit arrangement is integrated with the display unit by multiplexing the plurality of discrete gray level voltages in staircase fashion onto a high-voltage bus, identifying each of the discrete voltages appearing on the high-voltage bus with a four-bit code word applied to a code word bus, and matching at each pixel the word on the code word bus to the four bit data word identifying the gray level intensity voltage desired at the pixel. When the code word and the data word match, the pixel is disconnected from the high-voltage bus. Each pixel is provided with a sample and hold circuit to maintain the value of voltage reached for the desired amount of time. The multiplexer includes a high-voltage transistor switch for each of the gray levels which is sequentially activated to connect gray level input driving voltages to the high-voltage bus. A comparator circuit for each pixel matches the code word to the data word identifying the gray level intensity desired at the pixel and operates a high-voltage switch individual to the pixel to disconnect an output hold circuit individual to the pixel from the high-voltage bus.

BRIEF DESCRIPTION OF THE DRAWING

The foregoing and other features of the present invention may become more apparent when the ensuing description is read together with the drawing, in which.

GENERAL DESCRIPTION

Figure 1:
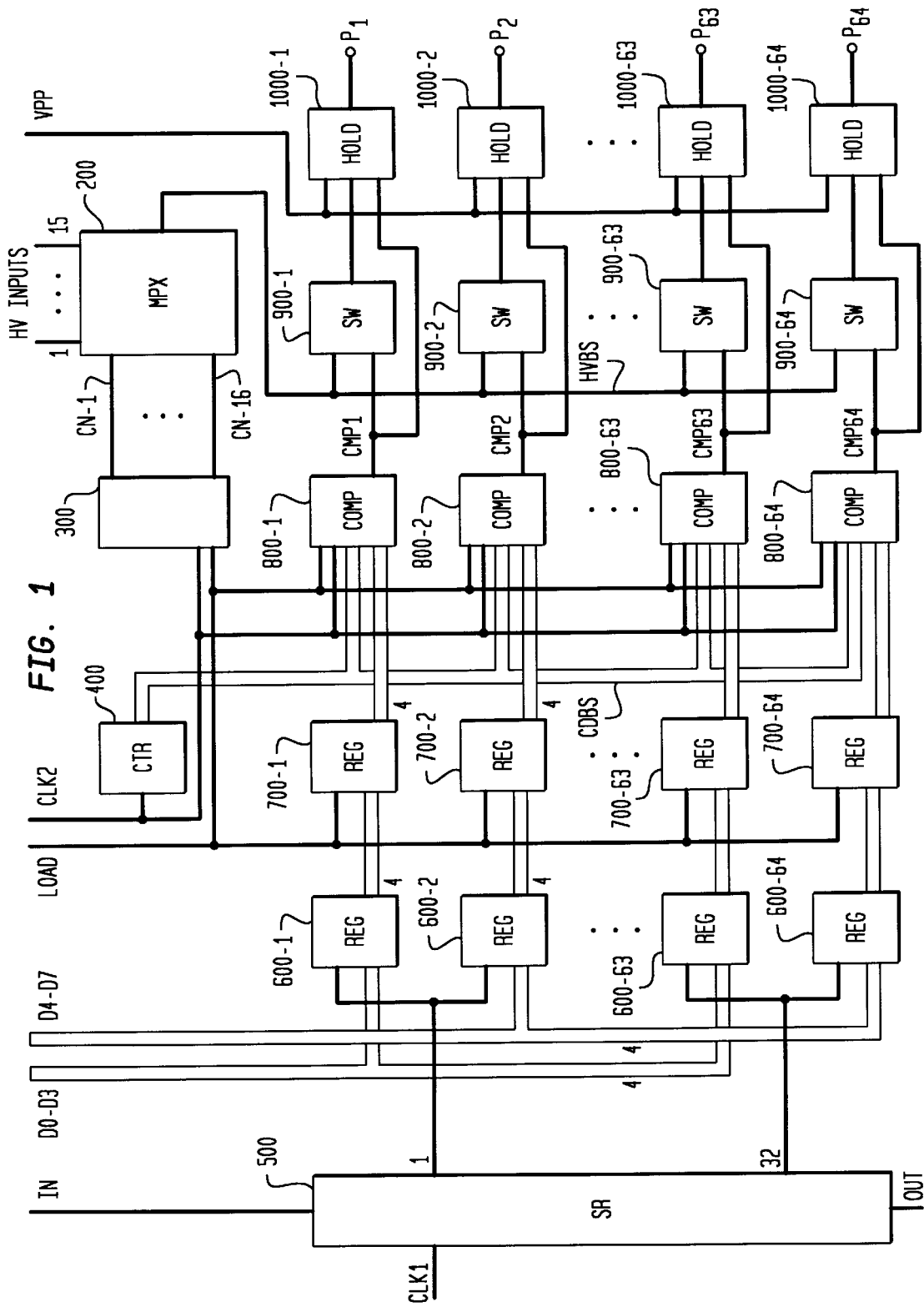
FIG. 1 schematically shows an arrangement for applying driving voltages, such as gray level voltages, to a concentrated group of pixels of a print head or electro-luminescent display.

Referring now to FIG. 1 of the illustrative embodiment, an integrated circuit arrangement is shown which is capable of supplying individual driving voltages to a highly concentrated pixel array, such as a 64-pixel sub-group of an electro-luminescent display. Typical applications would involve thousands of pixels and hence many 64-channel integrated circuits like those shown in FIG. 1 would be used.

At the left-hand side of FIG. 1, leads INPUT and CLK1 are pulsed high to initialize 32-bit shift register 500. Then, on the rising edge of each subsequent CLK1 pulse shift register 500 sequentially energizes each of its 32 output leads 1–32. The energization of each such output lead activates a pair of master data registers such as the first and last pair of master data registers 600-1, 600-2 and 600-63, 600-64, respectively. The activated pair of master data registers is enabled to store 4-bit data words appearing on data word buses D0–D3 and D4–D7 which respectively identify the gray level intensity desired at each of two pixels. After 32 clock pulses have appeared on clock lead CLK1, all 64 master data registers 600-1 through 600-64 are loaded and lead OUT of shift register 500 is energized to initialize a 32-bit shift register (not shown) for the next sub-array of 64 pixels.

As mentioned above, a typical system will involve many replications of the circuitry shown in FIG. 1. After all of the master data registers in the system have been loaded, input lead LOAD is pulsed high and the data stored in the master data registers such as registers 600-1 through 600-64 is transferred to an array of slave data registers such as slave registers 700-1 through 700-64. Data words can then begin to be loaded into the master data registers 600-1 through 600-64 again.

In the illustrative embodiment, a plurality of discrete gray level voltages, illustratively fifteen such voltages, are individually provided on input leads 1–15 by external circuitry, not shown, at the upper right-hand corner of FIG. 1. The voltages on input leads 1–15 typically may cover the range from 0 to 300 volts DC and hence are considered "high" voltages as compared to typical "logic level" voltages of 5 volts or less. A high-voltage multiplexer 200 includes fifteen high-voltage switches of the type shown in FIG. 2, each associated with a respective one of the fifteen gray level input voltages, plus one additional transistor switch (not shown) for pulling high voltage bus HVBS to ground, (level 0).

Figure 4:
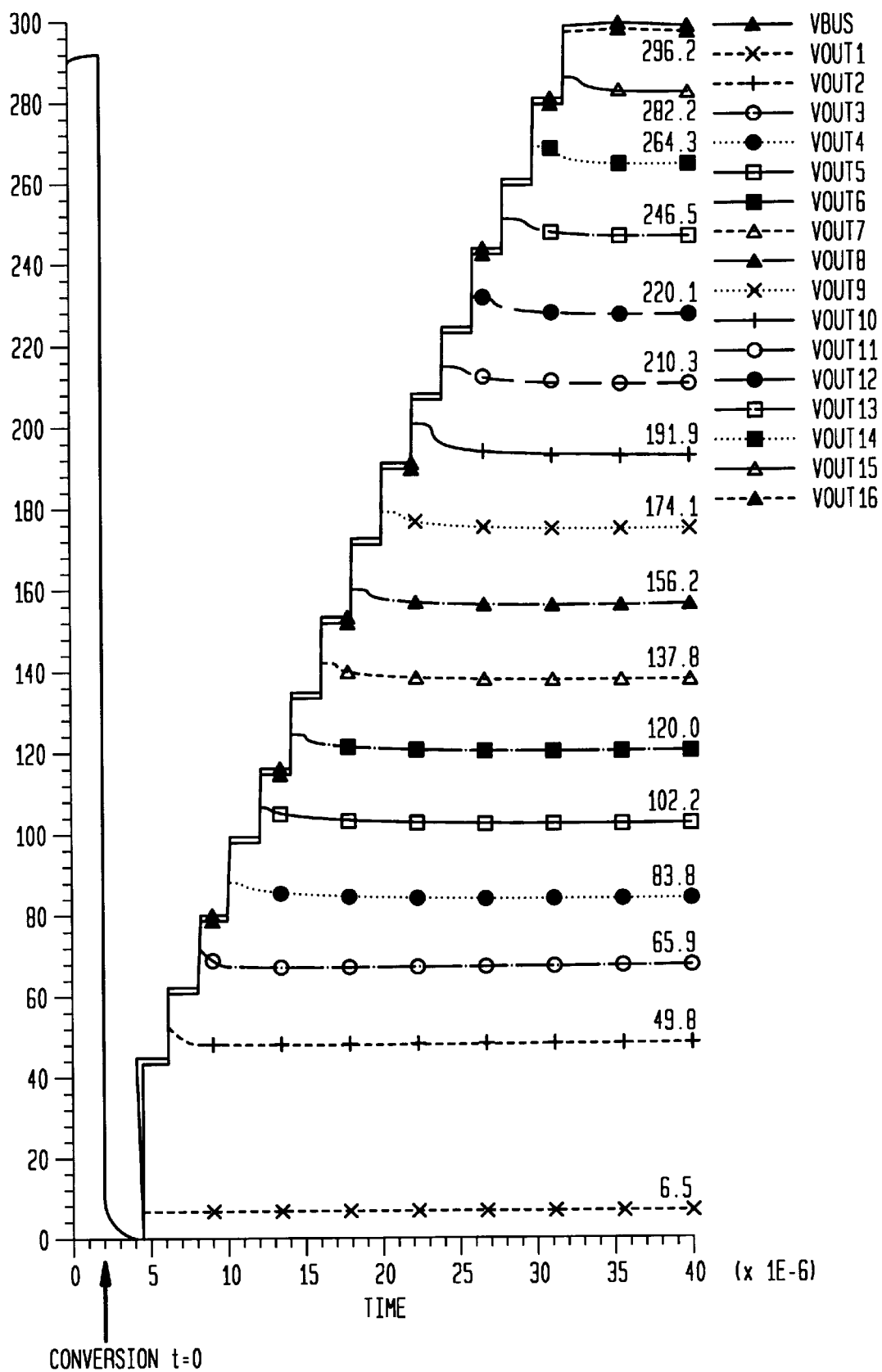
FIG. 4 shows the staircase voltage applied to the high-voltage bus.

Leads LOAD and CLK2 are pulsed high to initialize 4-bit counter 400 and 16-bit shift register 300, and also to set the latch in data comparator and latches 800-1 through 800-64. The setting of the comparator and latches 800 energizes high voltage switches 900-1 through 900-64 and output hold and drivers 1000-1 to 1000-64 which connect all of the outputs P-1 to P-64 to high voltage bus HVBS. At the same time, 4-bit counter 400 is reset to 0000 and 16-bit shift register 300 is initialized, thereby energizing the first one of the 16 switches in multiplexer 200 to pull high voltage bus HVBS and the outputs P- to zero volts. On the rising edge of each subsequent CLK2 pulse, 16-bit shift register 300 increments by one and energizes the next one of its 16 output leads cn-2 to cn-16. In consequence, one of the remaining 15 switches of multiplexer 200 connects a discrete one of the gray-level voltages from high-voltage input leads 1–15 to high-voltage bus HVBS, thus incrementing the voltage on bus HVBS in a staircase fashion, as shown in FIG. 4.

At the same time that multiplexer 200 connects each gray-level input voltage to bus HVBS, 4-bit counter 400 applies a pattern of signals representing a code word to code bus CDBS. The code word identifies the particular voltage then being applied to high-voltage bus HVBS. As each code word output of counter 400 appears on bus CDBS, the data in each of the slave data registers 700-1 through 700-64 is matched against the code bus by data comparator and latch circuits 800-1 through 800-64. When a match occurs at one or more of the data comparator circuits 800-1 through 800-64, the particular comparator circuit disconnects its associated one of high voltage switches 900-1 through 900-64 from high-voltage bus HVBS. The associated one of output hold and driver circuits 1000-1 through 1000-64 then holds its output to the voltage level it had achieved prior to being disconnected from bus HVBS. After 16 pulses of clock lead CLK2, all 64 channels of the pixel array have been programmed to their desired gray level voltages.

Figure 2:
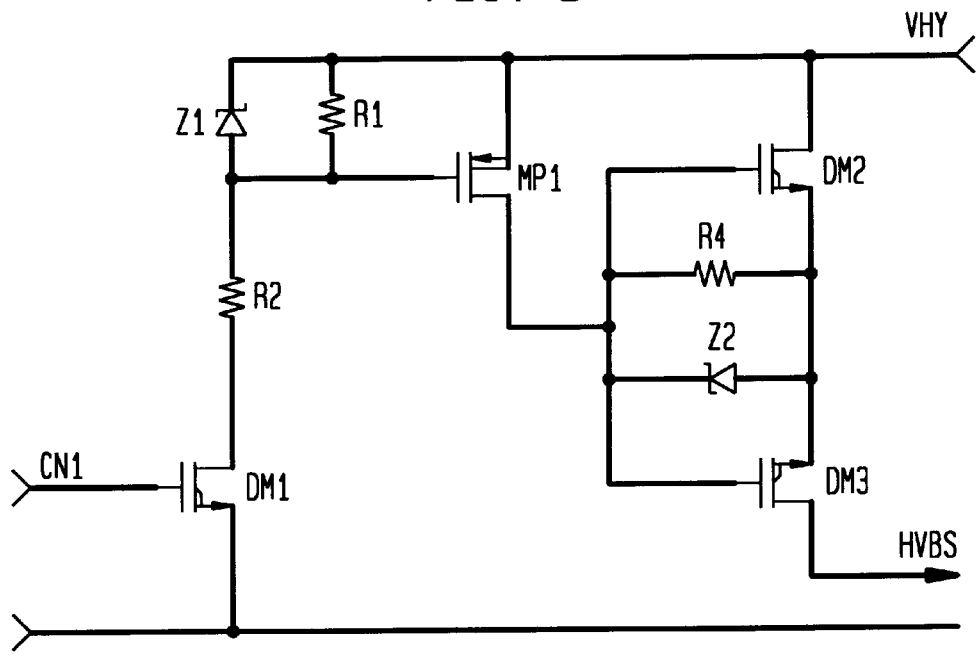
FIG. 2 shows a typical one of the high-voltage switches for multiplexing discrete gray level voltages to the high-voltage bus.

Referring now to FIG. 2, one of the 15 high-voltage switches of multiplexer 200 is shown. This switch is operated as 16-bit shift register 300 applies a high logic level signal (illustratively, 5 volts) pulse to input lead CN1 at the gate electrode of transistor DM1. Transistor DM1 is a high-voltage, N-type transistor which is turned on by the signal on lead CN1. The drain electrode of transistor DM1 is connected via resistor R2 to the gate electrode of transistor MP1 which is a high-voltage P-type transistor. When the shift register applies a high logic level signal to lead CN1, transistor DM1 is turned on which pulls down the gate of transistor MP1, turning it on. The discrete high-voltage input (supplied by external circuitry, not shown) to high-voltage input lead VHY is applied by transistor MP1 to the gates of transistors DM2 and DM3, turning these transistors on. These transistors turning on provide a path from high-voltage input lead VHY to high-voltage bus HVBS. Zener diode Z2, connected between the source and gate electrodes of transistors DM2 and DM3, prevents the gate-to-source voltages of transistors DM2 and DM3 from exceeding about 8 volts to prevent damage to the transistors. Zener diode Z1, connected between the gate electrode of transistor MP1 and high voltage input lead VHY, prevents the gate to source voltage of transistor MP1 from exceeding about 8 volts. Resistor R2 limits the current through DM1. When the shift register applies a low logic level to lead CN1 to turn transistor DM1 off, the gate electrode of transistor MP1 is no longer pulled low, allowing transistor MP1 to turn off, which then allows transistor DM1 and DM2 to turn off. Resistor R4 connected between the source and gate electrodes of transistors DM2 and DM3 facilitates the rapid turning off of transistors DM2 and DM3 when transistor MP1 is turned off. It does so by discharging the gate-to-source capacitance of transistors DM2 and DM3. Resistor R1 similarly facilitates rapid turn-off of transistor MP1 when transistor DM1 is turned off.

Figure 3:
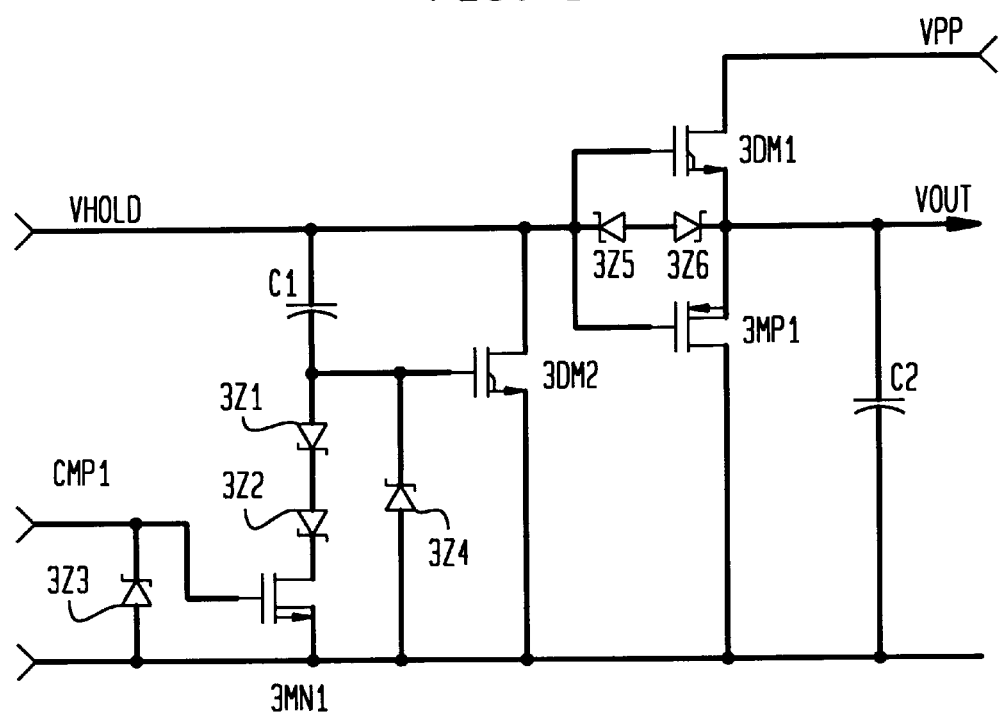
FIG. 3 shows a typical one of the output hold and driver circuits individual to a pixel.

FIG. 3 shows an illustrative one of the output hold and driver circuits 1000-1 through 1000-64 and the load capacitance C2 of the associated pixel. Circuit 1000-1, for example, allows its respective pixel channel lead VOUT to follow the voltage on high-voltage bus HVBS until the associated data comparator and latch 800-1 detects a match between the value stored in slave data register 700-1 and the code appearing on code bus CDBS. Briefly, so long as the signal on lead CMP1 (from data comparator and latch 800-1) is high, transistor 3MN1 is turned on. Capacitor C1 is connected between lead VHOLD (connected to high-voltage bus HVBS) and charges to the voltage appearing on HVBS. The gate electrode of transistor 3DM2 is kept two diode drops above ground by forward biased zener diodes 3Z1 and 3Z2 and its positive excursion is limited by the zener voltage of diode 3Z4 but the voltage at the gate of transistor 3DM2 is not high enough to turn transistor 3DM2 on so long as transistor 3MN1 is on. Transistor 3DM2 remains off. This allows transistor 3DM1 to turn on and to charge the load capacitance of the pixel, C2, toward VPP. The voltage on capacitance C2 will continue to increase toward VPP until the source electrode of transistor 3DM1 is approximately one threshold below the voltage of its gate electrode to which the voltage on lead VHOLD is applied, at which point transistor 3DM1 turns off.

When data comparator and latch 800-1 detects the code match, lead CMP1 goes low and transistor 3MN1 is turned off so that it no longer drags down the gate of transistor 3DM2. High voltage switch 900-1 is also turned off, disconnecting the output hold and driver 1000-1 from high voltage bus HVBS. The gate of transistor 3DM2 is held just below its threshold so transistor 3DM2 is ready to turn on upon any positive excursion of its gate. As the switches of multiplexer 200 continue to apply the "staircase" of discrete voltages to bus HVBS, a transient voltage is coupled through the drain - source capacitance of turned-off high voltage switch 900-1. This transient tends to raise the voltage on lead VHOLD. Since capacitor C1 does not respond instantaneously, the voltage on the gate of transistor 3DM2 rises a small amount, turning transistor 3DM2 on. This shunts the coupled charge to ground so that the output stays essentially constant. Zener diode 3Z4 protects the gate of transistor 3DM2 from excessive positive voltages (illustratively, no more than +8 volts). Zener diodes keep the gate of transistor 3DM2 at least two voltage drops (illustratively 1.2 volts) above ground (and just below the threshold of transistor 3DM2 (1.8 volts), when transistor 3MN1 is on This allows transistor 3DM2 to respond a little faster to spurious positive-going "glitches" on lead VHOLD. This also allows capacitor C1 to be a relatively small value of capacitance since it only senses the "glitches"; the holding is accomplished primarily by transistor 3DM2. Zener diodes 3Z5 and 3Z6 connected between the source and gate electrodes of transistors 3DM1 and 3MP1 prevent the gate to source voltage from exceeding about 8 volts. Transistor 3MP1 facilitates the discharge of the pixel load capacitance C2 at the beginning of each conversion cycle as VHOLD is pulled to ground via the high voltage bus HVB.

What has been described is deemed to be illustrative of the principles of the invention. Numerous modifications may be made by those skilled in the art without, however, departing from the spirit and scope of the invention.

What is claimed is:

1. An integrated circuit adapted to operate with a high voltage bus and a source of discrete gray-level voltages for driving a pixel array, said circuit comprising:

a circuit for storing a gray-level identifying code for each pixel of said array;

a code bus;

a circuit for sequentially applying said gray-level identifying code to said code bus; and a circuit for matching a stored gray-level identifying code with said code applied to said code bus for connecting a corresponding one of said discrete gray-level voltages from said high-voltage bus to an individual pixel of said array.

2. An integrated circuit according to claim 1 wherein said gray-level voltages applied by said circuit for selecting and applying sequentially connects increasing ones of said discrete voltages to said high-voltage bus.

3. A method of applying discrete gray-level voltages to a pixel array comprising the steps of:
   a. multiplexing a sequence of discrete voltages on to a high-voltage bus;
   b. storing for each pixel of the array a data code identifying a predetermined discrete voltage desired at said pixel;
   c. identifying each one of said sequence of discrete voltages appearing on said high-voltage bus with a corresponding code; and
   d. connecting said high-voltage bus to a pixel when said data code stored for said pixel matches a corresponding identifying code of said sequence of discrete voltages.

4. A method of applying discrete gray-level voltages to a pixel array according to claim 3 wherein said multiplexing step includes generating a staircase of sequentially increasing ones of said predetermined voltages.

5. An integrated circuit for connecting a plurality of individual gray-level voltage sources to a pixel circuit array, comprising
   a high-voltage bus;
   means for individually connecting said sources to said high-voltage bus one at a time;
   means for storing data identifying a particular gray level to be effected at a corresponding pixel of said array;
   means for generating a repetitive sequence of codes identifying said gray-level voltages individually connected to said high-voltage bus; and
   means jointly controlled by said generating means and said storing means for connecting said high-voltage bus to individual pixel circuits of said array.

6. An integrated circuit pixel array according to claim 5, wherein said means for storing said identifying data includes a register individual to each pixel circuit of said array and a shift register for sequentially accessing each said register.

7. An integrated circuit pixel array according to claim 5, wherein said means for individually connecting said sources to said bus includes a plurality of switches each comprising:
   a first transistor (DM1), said first transistor being temporarily energizable;
   a second transistor (MP1) having its source-drain path connected between one of said sources and the gate electrodes of a third (DM2) and fourth (DM3) transistor, said second transistor being connected to be turned on when said first transistor is turned on;
   said third and fourth transistors being connected in series between one of said sources and said high-voltage bus, said second transistor being adapted to turn on said third and fourth transistors when said one of said sources is to be connected to said bus.

8. An integrated circuit pixel array according to claim 7 wherein said first and said second transistors are of opposite conductivity type.

9. An integrated circuit pixel array according to claim 5 wherein said means for connecting said high-voltage bus to the pixel circuits of said array comprises:
   capacitance means (C1) for storing a gray level voltage individual to each of said pixels;
   a pair of opposite-conductivity type source-follower connected transistors (3DM1, 3MP1) individual to each of said pixels connected between said high-voltage bus and said capacitance means; and
   transistor means (3MN1, 3DM2) connected to the gates of said source-follower connected transistors, said transistor means being adapted to hold constant said gray level voltage applied to said pixel when said identifying code matches said generated code.

10. An integrated circuit pixel array, comprising
    a plurality of pixel circuits;
    a capacitor individual to each of said pixel circuits for holding a voltage corresponding to a gray-level to be effected at said pixel;
    a plurality of individual gray-level voltage sources;
    a high-voltage bus;
    a plurality of switches for individually connecting said sources to said high-voltage bus one at a time;
    a data store for storing a data word identifying a particular gray-level to be effected at each pixel of said array;
    a code generator for generating a code identifying the value of the high-voltage connected to said high-voltage bus by the one of said sources connected to said bus; and
    a code matching circuit for matching said identifying code to said data word in said data store to control the connection of said high-voltage bus to said individual capacitor.

11. An integrated circuit pixel array according to claim 10, wherein said code matching circuit includes a register individual to each pixel of said array and a counter for sequentially accessing each said register.

12. An integrated circuit pixel array according to claim 10, wherein said code matching circuit connects said high-voltage bus to a holding circuit individual to each of said pixel circuits until said identifying data word matches said code from said code generator.

13. An integrated circuit pixel array, comprising
    a plurality of pixel circuits;
    a plurality of individual gray-level voltage sources;
    a high-voltage bus;
    a multiplexor for connecting said sources to said bus one at a time;
    a register individual to each pixel circuit of said array for storing data identifying a particular gray level to be effected at a corresponding one of the pixels;
    a code generator providing a sequence of codes identifying each said gray-level voltage being connected to said high-voltage bus;
    a matching circuit individual to each pixel for detecting when said data matches one of said codes; and
    a switch individual to each pixel controlled by said individual matching circuit for determining the connection of said high-voltage bus to a corresponding one of said pixel circuits.

14. An integrated circuit pixel array according to claim 13 wherein said switch normally connects said pixel circuits to said high voltage bus and wherein said matching circuit controls said switch to disconnect said selected ones of said pixel circuits from said bus when the data in said storing register matches a code provided by said code generator.

15. An integrated circuit pixel array according to claim 13 wherein said multiplexor connects said sources to said bus to provide a staircase of voltages thereto.

* * * * *